Dec. 17, 1929.  J. H. ABRAMSON  1,740,055

EXPANSIVE BIT

Filed March 12, 1928

Inventor
John Herbert Abramson
By Wilson & McCanna
Attys.

Patented Dec. 17, 1929

1,740,055

UNITED STATES PATENT OFFICE

JOHN HERBERT ABRAMSON, OF ROCKFORD, ILLINOIS, ASSIGNOR TO GREENLEE BROS. & CO., OF ROCKFORD, ILLINOIS, A CORPORATION OF ILLINOIS

EXPANSIVE BIT

Application filed March 12, 1928. Serial No. 260,850.

This invention relates to an improved expansive bit.

The principal object of my invention is to provide an expansive bit of simple construction and using fewer parts, while enabling quick and accurate setting of the bit to the desired size and also positively locking the same, a special advantage residing in the fact that the matter of adjusting and locking or unlocking the bit necessitates only the use of an ordinary screw driver, such as every carpenter, electrician, or other workman having use for a tool of this kind always carries.

The bit made in accordance with my invention has the boring head thereof milled to provide a transversely inclined guideway for slidably receiving the shank of a blade extensible to different radii according to the size of hole to be bored, the blade being preferably provided with a scale and the head having an index mark to cooperate therewith so as to facilitate accurately setting the bit to the desired size. The blade has threads cut in the edge of the shank thereof engaged by an adjusting screw received in a hole provided in the head alongside of and communicating with the aforesaid guideway. The adjusting screw, which is operable with a screw driver to adjust the blade, is held against endwise movement by a tapered portion on a screw threaded into the head at right angles thereto, the tapered portion being received in an annular groove cut in the adjusting screw intermediate the ends thereof. The arrangement is such that the adjusting screw may be locked with the blade by a clamping action resulting when the other screw is tightened, the tapered portion of the last mentioned screw being then arranged to make wedging engagement in the annular groove of the adjusting screw so as to bind the adjusting screw with the blade in the adjusted position thereof. The invention is illustrated in the accompanying drawing wherein—

The same reference numerals are applied to corresponding parts throughout the views.

Figure 1:
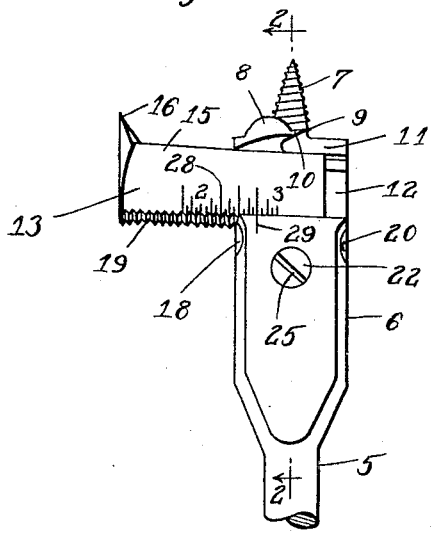
Figure 1 is an elevational view of my improved expansive bit, only a part of the shank of the bit being shown.
Figure 3:
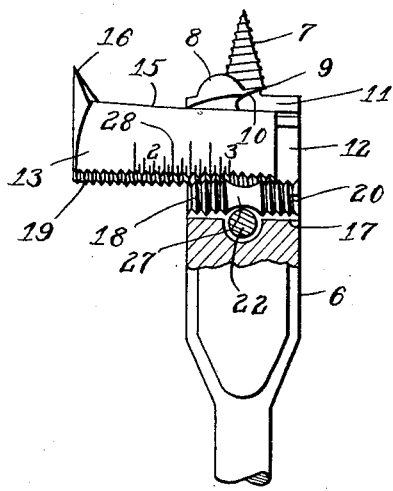
Fig. 3 is a view corresponding to Fig. 1 with certain parts appearing in section in the plane of the line 3—3 of Fig. 2.
Figure 2:
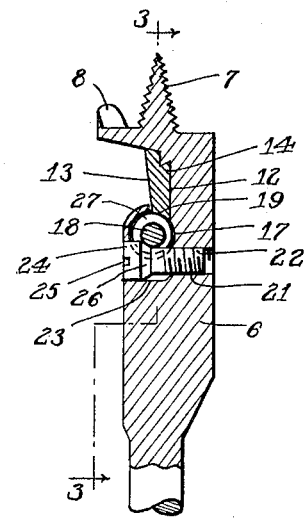
Fig. 2 is a longitudinal section taken on the line 2—2 of Fig. 1.

The expansive bit of my invention, as appears in the drawing, comprises a shank 5 having an enlarged substantially semi-cylindrical head 6 provided on the end thereof, concentric with the shank and provided with the usual draw screw 7, sharpened circle-cutting spur 8, and sharpened chip-raising knife 9. The latter is suitably formed on what is ordinarily known as an extension lip, shown at 10, whereby to permit sharpening of the knife edge time and again. A throat is formed at 11 for the passage of the chips raised by the knife 9. The head 6 has a transverse dovetail-shaped groove 12 milled therein near the boring end thereof and on an incline, as best appears in Figs. 1 and 3. An extensible blade 13 has a dovetail back 14 having a working fit in the groove 12 so that the latter serves as a guideway for the blade. The blade has an approximately radial cutting edge 15 and a circle-cutting spur 16 thereon, the former cooperating with the chip-raising knife 9 and the latter serving to cut circularly to the radius of the hole to be bored. A hole 17 is drilled through the head 6 alongside of and parallel with the groove 12, as shown in Fig. 3, and also communicating therewith, as best appears in Fig. 2. An adjusting screw 18 smaller in diameter than the hole 17 is received in the hole and arranged so that the threads thereof fit in the threads 19 cut in the edge of the shank of the blade 13. The adjusting screw 18 has a slot 20 in at least the one end thereof to permit turning the same with an ordinary screw driver. Another hole 21 is drilled through the head at right angles to the hole 17 and is tapped to receive a screw 22, which I may refer to as a locking screw but which actually performs two functions, as will presently appear, namely that of holding the adjusting screw 18 against endwise movement, and that of locking both the adjusting screw and blade in adjusted position. The hole 21 is counter-bored as appears at 23 for reception of the head 24 of the screw 22, the latter being provided with a slot 25 to permit tightening or loosening the same with an ordinary screw driver. The back of the head 24 is tapered, as shown at 26 in Fig. 2, and fits in an annular groove 27 provided in the adjusting screw 18 intermediate the ends thereof.

In the adjustment of the bit the screw 22 is loosened with a screw driver just enough to permit the adjusting screw 18 to be turned. The turning of the screw one way extends the blade 13 and the turning of the same in the other direction retracts the blade, the size of the hole which the bit will bore in its different settings being easily ascertained by reference to the scale 28 provided on the shank of the blade 13, in connection with which an index mark 29 is provided on the head 6 alongside of the groove 12. The screw and rack adjustment obviously enables close setting of the bit to the desired size. In the back and forth adjustment of the blade 13 the adjusting screw 18 is held against endwise movement by reason of the engagement of the tapered portion 26 of the locking screw 22 in the groove 27. When the proper adjustment of the blade has been made it can be locked with the screw 18 by simply giving the screw 22 a quarter or half turn, just enough to cause the beveled portion 26 of the locking screw to make wedging engagement in the groove 27 and thus bind the screw 18 with the threads 19 on one edge of the shank of the blade 13 and also bind the other edge of the shank of the blade by its dovetail back 14 in the groove 12. It takes very little effort with a screw driver to make the blade 13 absolutely rigid and proof against loosening and getting out of adjustment in the subsequent use of the bit, and, of course, the matter of unlocking is equally as simple. No wrenches, pliers, or other tools are needed in connection with the bit; just an ordinary screw driver such as every carpenter, electrician, or other workman who would have use for a tool of this kind carries in his tool kit. The design and construction of the bit involves the use of practically the minimum possible number of parts, all of which are capable of production at fairly low cost and are of such characteristics that the tool is rendered extremely serviceable and practical for all-round use.

It is believed the foregoing description conveys a clear understanding of the expansive bit of my invention and of the various advantages which it offers over those heretofore available. While reference has been made to certain specific details of design and construction it should be evident that various changes might be made without seriously departing from the invention. For that reason all legitimate modifications and variations are intended to be covered in the appended claims.

I claim:

1. In an expansive bit, a head having a transverse guideway extending substantially centrally therethrough at the boring end thereof and having a hole extending therethrough parallel with the guideway and intersecting the same, an adjustable blade slidably received in said guideway, one edge of said blade being serrated to provide threads, an adjusting screw in said hole engaging the threads on the edge of said blade, and a single means for preventing endwise movement of said screw and arranged to clamp the screw with the blade in adjusted position.

2. An expansive bit as set forth in claim 1 wherein the last mentioned means comprises a screw disposed in transverse relation to the adjusting screw and having a portion thereof fitting in an annular groove provided in the adjusting screw intermediate the ends thereof, said screw in one position permitting the turning of the adjusting screw but holding the same against endwise movement, and in another position serving to lock the adjusting screw against turning whereby to lock the blade in adjusted position.

3. In an expansive bit, a shank having an enlarged substantially semi-cylindrical boring head formed on the end thereof and substantially concentric therewith, said head having the flat side thereof provided with a dovetail-shaped groove, a blade having a dovetail back slidably received in said groove to permit adjustment of the blade radially relative to the head, one edge of the dovetail back of the blade having threads cut therein, said head having a hole therein parallel with said groove and intersecting the side thereof on the threaded side of the blade, an adjusting screw loosely received in said hole with the threads thereof projecting into the side of the groove and meshing with the threads on the blade, the adjusting screw having an annular groove formed therein intermediate the ends thereof, said head having a hole therein at right angles to the first hole and intersecting one side thereof, and a second screw threadedly received in said hole with the shank thereof fitting in said groove to hold the adjusting screw against endwise movement, the tightening of said second screw being arranged to bring a part into engagement with said screw to hold the same against turning.

4. An expansive bit as set forth in claim 3 wherein the second screw has an enlarged tapered portion arranged in the tightening of the screw to make wedging engagement in the annular groove in the adjusting screw whereby to hold the latter screw against turning.

5. An expansive bit as set forth in claim 3 wherein the second screw has an enlarged tapered portion arranged in the tightening of the screw to make wedging engagement in the annular groove in the adjusting screw, said adjusting screw being arranged upon wedging engagement of said tapered portion therewith to be moved bodily toward the blade whereby to bind the screw with the blade in adjusted position.

6. In an expansive bit, a head having a transverse guideway extending substantially centrally therethrough at the boring end thereof, a blade slidably received in said guideway for adjustment relative to the head, one edge of the shank portion of said blade received in said guideway being provided with teeth, said head having a hole therein parallel with the guideway and intersecting the side thereof on the toothed side of the blade, an adjusting screw in said hole having the threads thereof fitting between the teeth of the blade, the screw being held against endwise movement in said hole, said head having a second hole therein at right angles to and intersecting one side of the first hole, and a screw threadedly received in said hole having a tapered portion thereon arranged when the screw is tightened to make wedging engagement with the adjusting screw to lock the latter.

7. An expansive bit as set forth in claim 6 wherein the adjusting screw is provided with an annular groove intermediate the ends thereof wherein the tapered portion of the other screw is arranged to be received, said adjusting screw being free to turn but being held against endwise movement by reason of the engagement of the tapered portion of the other screw in its groove, and said adjusting screw being locked when the other screw is tightened because of the wedging engagement of said tapered portion in said groove.

8. In an expansive bit, a body member having a transverse recess having guides for a movable cutter, a cutter mounted for adjustment in said guides, a transverse screw in the body and having threaded connection on one side with said cutter, said screw having a peripheral groove and a clamping screw engaging in said groove on the opposite side from the cutter to clamp the cutter in adjusted positions in its guides.

In witness of the foregoing I affix my signature.

JOHN HERBERT ABRAMSON.